April 25, 1950 J. BRISKIN ET AL 2,505,661
CAMERA CASE AND LOCKING MECHANISM THEREFOR
Filed March 27, 1948 3 Sheets-Sheet 1
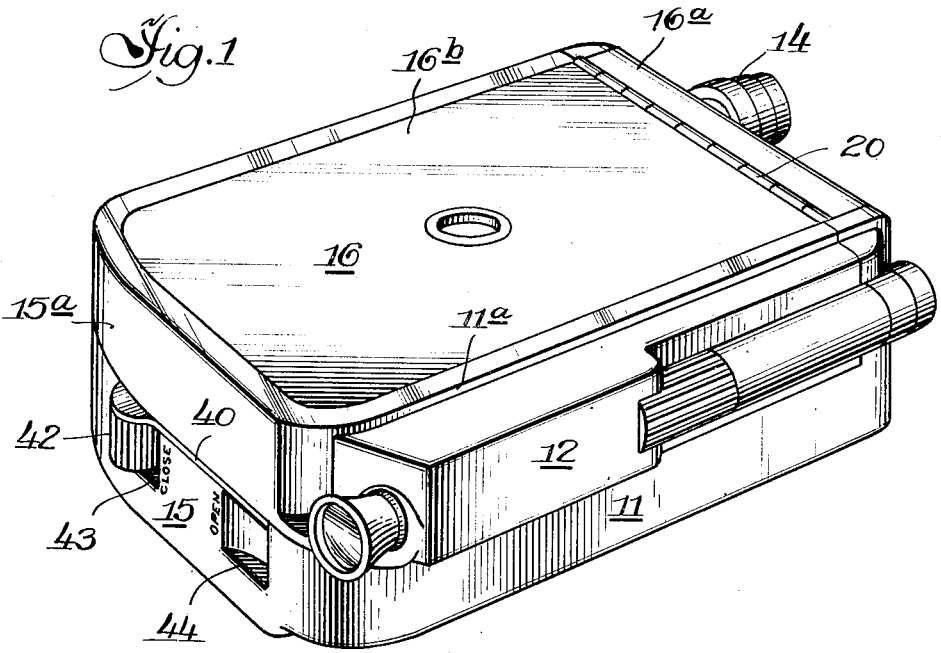
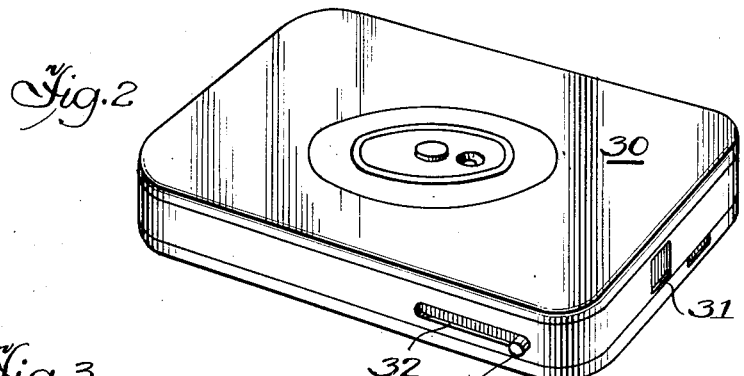
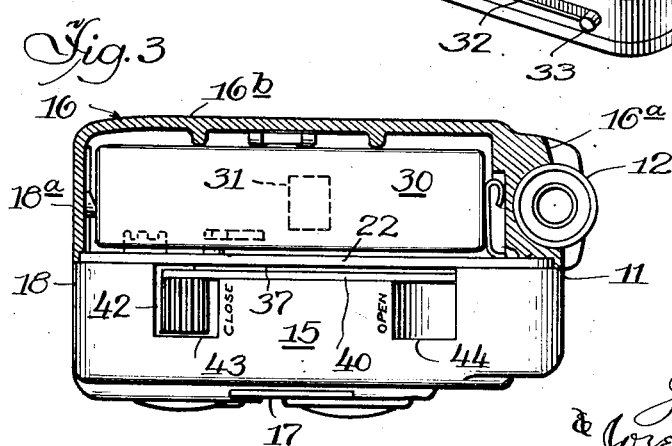
INVENTORS.
Jack Briskin
& Joseph J. Golick
Zabel and Gritzbaugh Attys.

April 25, 1950 J. BRISKIN ET AL 2,505,661
CAMERA CASE AND LOCKING MECHANISM THEREFOR
Filed March 27, 1948 3 Sheets-Sheet 2
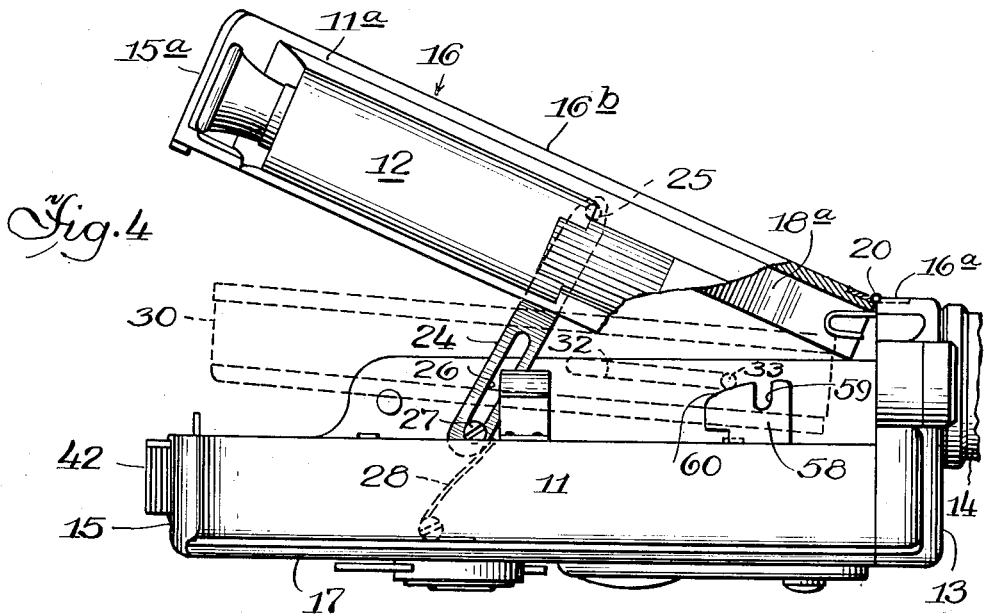
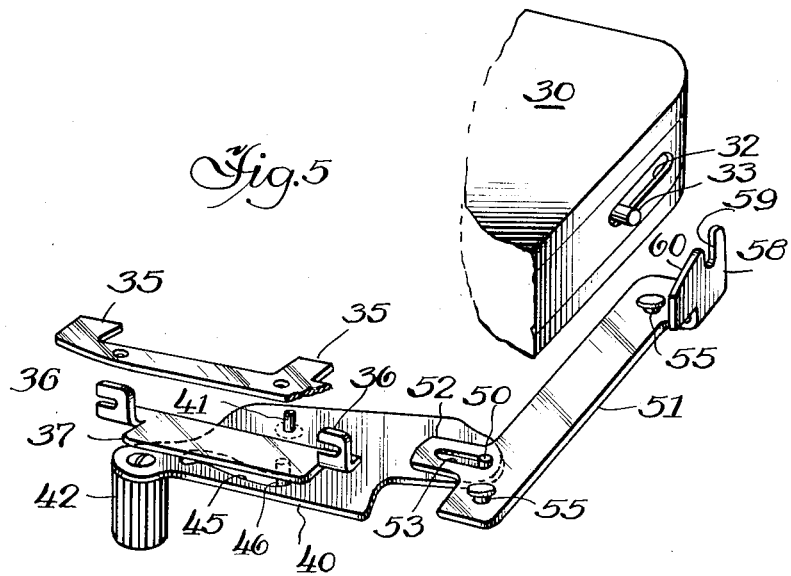
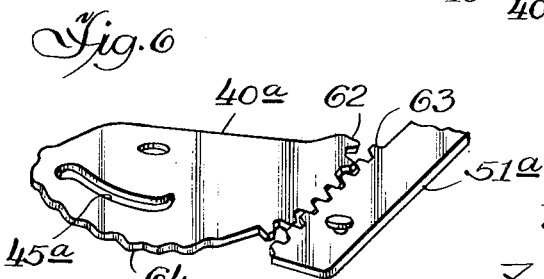
INVENTORS.
Jack Briskin
& Joseph J. Golick
Zabel and Gritzbaugh Attys.

April 25, 1950     J. BRISKIN ET AL     2,505,661
CAMERA CASE AND LOCKING MECHANISM THEREFOR
Filed March 27, 1948     3 Sheets-Sheet 3
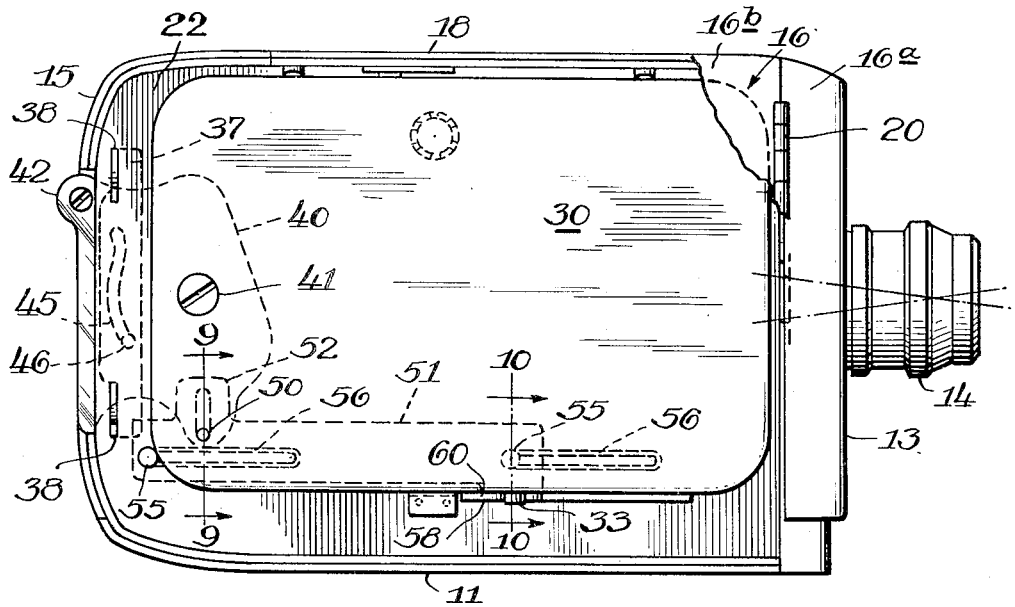
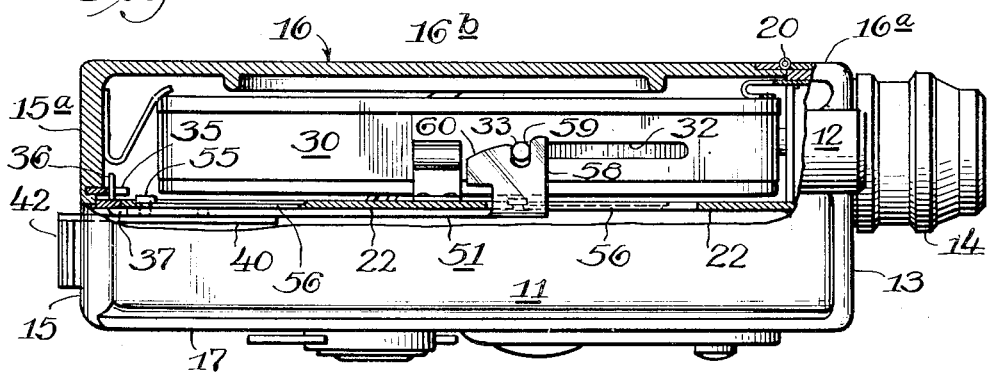
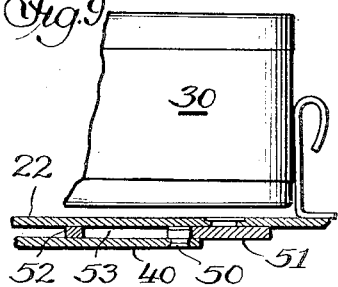 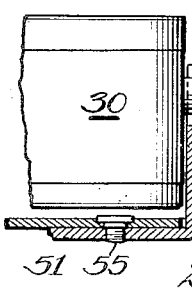
INVENTORS.
Jack Briskin
& Joseph J. Golick
Zabel and Gritzbaugh Attys.

Patented Apr. 25, 1950

2,505,661

UNITED STATES PATENT OFFICE 2,505,661

CAMERA CASE AND LOCKING MECHANISM THEREFOR

Jack Briskin and Joseph J. Golick, Chicago, Ill., assignors to Revere Camera Company, Chicago, Ill., a corporation of Delaware Application March 27, 1948, Serial No. 17,524

4 Claims. (Cl. 88—17)

This invention relates to a camera case for a motion picture camera of the type utilizing a film magazine, the case including an improved mechanism for locking and unlocking the door of the case. The door locking mechanism is provided with a cooperating means for actuating the shutter of the film magazine in timed relationship with the operations of door locking and unlocking.

Motion picture cameras of the magazine type are currently accepted as particularly desirable for amateur use. The film for this type of camera is packaged in a container called a magazine. Such a magazine is quickly and easily inserted bodily into a magazine chamber provided in the camera, and the camera is merely closed and locked in order to condition the camera for motion picture taking. There is no complicated threading of film or other operations that might result in errors such as accidental, premature film exposure. Our invention concerns itself with the case for a magazine type camera of this general character.

One object of the invention is to provide a camera case having a door that opens in a manner so as to permit the operation of magazine loading to be accomplished with extreme ease. The construction of the case has taken into consideration various practical aspects of normal camera use such as field loading where the amateur must hold the camera in one hand and insert the magazine with the other.

Another object is to provide an improved locking mechanism particularly suited to the present camera case. This locking mechanism utilizes a single manual control that has two normal operative positions, the "open" position and the "close" position.

The film magazines used with this type of camera have an aperture through which the film is exposed. This aperture is in optical alignment with the objective lens of the camera when the magazine is operatively positioned in the camera. The magazine also has a shutter that is adapted to cover and close the aperture when the magazine is exposed to light, that is, when the magazine is not inside the camera. It will be understood that oftentimes a partially exposed magazine will be removed and replaced with another partially exposed magazine, as is encountered when maintaining predetermined film sequences, or when interchanging between black and white, and color film. Therefore, after loading the camera with a magazine, it is necessary to open the shutter prior to picture taking. Conversely, when unloading the camera, it is necessary to close the shutter before the magazine is withdrawn and exposed to light conditions.

Accordingly, another object of the invention is to provide means in conjunction with the door locking mechanism for opening and closing the magazine shutter in timed relation with the operations of locking and unlocking of the door. The shutter actuating means is such that all possibility of inadvertent film exposure during unloading is substantially eliminated. Specifically, the locking mechanism and actuating means cooperate to close the shutter completely prior to mechanism action that unlocks the camera door. Therefore, when the door is finally released so that the magazine may be removed, the shutter is fully closed.

Other objects and advantages of the invention will become apparent as the description proceeds, reference being had to the accompanying drawings wherein one form of the invention is shown. It is to be understood that the description and drawings are illustrative only, and are not to be taken as limiting the invention except insofar as it is limited by the claims.

In the drawings:

Fig. 1 is a perspective view of a movie camera utilizing the present invention;

Fig. 2 is a perspective view of a typical film magazine for use in such a camera;

Fig. 3 is a rear end view, partly in section, of the camera showing a magazine positioned therein;

Fig. 4 is a top view, partly broken away, of the camera showing the camera door in fully open position;

Fig. 5 is a perspective view showing in detail one form of our locking mechanism and associated shutter controlling means;

Fig. 6 is a perspective view showing a modified form of certain of the elements shown in Fig. 5;

Fig. 7 is a side view of the camera with most of the door broken away to show the within contained magazine;

Fig. 8 is a top view, partly in section, of the camera with the door in closed and locked position;

Fig. 9 is a fragmentary sectional view on line 9—9 of Fig. 7; and

Fig. 10 is a fragmentary sectional view on line 10—10 of Fig. 7.

Referring to the drawings, and particularly to Fig. 1 thereof, our improved camera case has a top 11 (containing view finder 12), a front end 13 (Figs. 4, 7 and 8) containing an objective 14, a rear end 15 and opposing sides 16 and 17 (Figs. 3, 4 and 8). The case bottom is indicated by 18 in Figs. 3 and 7. The aforesaid ends, sides, top and bottom enclose a space, a portion of which contains a motor and film advancing parts (not shown) and another portion of which comprises a magazine chamber.

The side 16 is formed in two parts, one a relatively short, fixed front portion 16a, the other a relatively long, movable rear portion 16b that constitutes a door for the case. Suitable pivoting means much as a piano type hinge 20 forms a connection between portions 16a and 16b of the side 16 as best shown in Figs. 1, 4, 7 and 8.

The top 11, bottom 18 (Fig. 3) and rear end 15 each may be divided into two portions, one of which in each case is integral with the movable portion 16b of side 16. Thus, top portion 11a that carries most of view finder 12, side portion 18a (Fig. 3) and rear end portion 15a each are connected to the side portion 16b. These portions define all but one side of the aforementioned magazine chamber. The remaining side of the magazine chamber is provided by a plate 22 that subdivides the case interior into two substantially equal spaces. One space contains the camera motor and allied mechanism, (not shown), hereinafter sometimes called the body portion of the camera, while the other space forms the magazine chamber.

Referring particularly to Fig. 4, a link 24 is provided to limit the extent (about 45 degrees) to which the door (portions 16b, 15a, 11a and 18a) of the case can be opened. One end of link 24 is pivotally mounted at 25 to portion 18a of the door, while the other end has a slot 26 therein that engages a pin 27 protruding from the interior surface of bottom 18. A spring element 28 bears against this latter end of link 25 to provide a friction relationship between link 24 and the pin 27. Accordingly, the door does not swing in a free manner, but rather must be manually moved to overcome the friction thus provided. This makes the case easier to manipulate during film loading and unloading, particularly under field conditions.

The previously mentioned film magazine is shown at 30 in Figs. 2, 3, 4 (dotted lines), 5, 7, 8, 9 and 10. Referring to Fig. 2, magazine 30 has exposure aperture 31 at its front end and a slot 32 in its top. Within the magazine there is a shutter (not shown) that is movable to open and close exposure aperture 31. The shutter is operatively connected to a controlling pin 33 that protrudes through slot 32. When pin 33 is at the forward end of the slot as shown in Fig. 2, the shutter is in closed position. Conversely, when controlling pin 33 is at the rear of slot 32, the shutter is open. As mentioned above, it is important that the shutter be closed at all times except when the magazine is in picture taking position within the closed and locked camera use.

Having thus described the camera case and the film magazine used therein, the locking mechanism for the door together with associated means for actuating the magazine shutter will now be described. The details of this mechanism are best shown in the perspective view, Fig. 5.

A pair of spaced, fixed engageable members 35 are carried on the interior of portion 15a of rear end 15. This portion 15a is the end of the door opposite to the end associated with hinge 20. The remaining elements of the locking mechanism are carried by the body portion of the camera case.

A pair of spaced, movable engaging members 36 are disposed in cooperating relationship with engageable members 35. The engaging members 36 are carried by a sliding bar 37 that moves parallel to the case end 15. Sliding bar 37 is disposed on the body portion side of dividing plate 22, and the upstanding engaging members 36 extend through slots 38 (Fig. 7) provided in the plate. Engaging members 37 are adapted to move back and forth within the cooperating slots 38, the members 37 locking themselves with engageable members 35 when in one position, and being free of said members when being in their alternative position.

The sliding bar 37 is moved back and forth by means of a plate 40 that is mounted for pivotal rotation on a pin 41. The pin 41 may be carried by the aforementioned dividing plate 22. A knob 42 is attached to plate 40 so that the plate may be manually rotated. As shown in Fig. 1, rear end 15 has recesses 43 and 44 that receive knob 42 at its two extreme alternative positions. Knob 42 is in recess 43 when the lock is in "close" position, and it is in recess 44 when in "open" position.

Referring again to Fig. 5, rotatable plate 40 is provided with an arcuate slot 45, the axis of rotation 41 being the geometric center of the arc. A pin 46 depends from sliding bar 37 and enters slot 45. The length of slot 45 is such that the slot ends respectively engage and move pin 46 when plate 40 is substantially at the limits of its rotation. These limits, of course, are reached when knob 42 is received within the respective recesses 43 and 44 above mentioned.

It will be noted in Fig. 5 that the locking mechanism is in "close" position, although the engageable members 35 are shown for convenience in a plane somewhat above engaging members 36. The pin 46 and associated sliding bar 37 have been moved to the left by the end of slot 45 during the last few degrees through which plate 40 has been rotated. In actuating the locking mechanism to "open" position, knob 42 is moved to the right (looking at Fig. 5), thus rotating plate 40 in a counterclockwise direction. During the larger portion of this rotation, slot 45 travels from left to right with reference to pin 46 and the pin remains stationary. During the last few degrees of rotation the end of slot 45 reaches pin 46 and moves the pin to the right a sufficient distance to free members 36 from members 35. The slot ends are slightly enlarged, as shown, to permit this action without binding.

The right-hand end of plate 40, as shown in Fig. 5, has an upstanding pin 50. A sliding bar 51 has a lateral extension 52 containing an elongated slot 53. The pin 50 is received within elongated slot 53 as shown in the figure. Sliding bar 51 carries a pair of spaced, headed pins 55 that engage and are guided by spaced, elongated slots 56 (Figs. 7 and 8) in plate 22. Sliding bar 51 carries an upstanding lug 58 having a slot 59 therein. A tapered cam surface 60 leads from the rear to the entrance of slot 59 as shown in Figs. 4 and 5.

The sliding bar 51 with its slot 59 and cam surface 60 cooperates to actuate the shutter controlling pin 33 of magazine 30. It will be noted that sliding bar 51 by virtue of its connection to plate 40 responds in a positive manner to plate rotation. In other words, rotation of plate 40 in either direction is translated directly into corresponding longitudinal motion of sliding bar 51.

The length of sliding bar 51 is such that its slot 59 registers with pin 33 of magazine 30 when the magazine is properly positioned within the magazine chamber. During the act of loading, the camera door is, of course, open, and the locking mechanism is in the alternative position to that shown in Fig. 5. At this time sliding bar 51 is in its extreme, forward position. Control pin 33 likewise is in its extreme, forward position in slot 32 prior to loading, that is, the shutter is closed. Upon inserting magazine 30 in the magazine chamber, pin 33 rides on cam surface 60 of sliding bar 51 and finally drops into slot 59. Thereafter, the door is closed and knob 42 is moved in a clockwise direction from recess 44 to recess 43. This rotates plate 40 on its axis 41 and moves sliding bar 51 to its extreme, rearward position. Pin 33 thus is moved to its rearward position and the magazine shutter is opened. Toward the end of the rotation of plate 40, the engaging members 36 interfit with the engageable members 35 of the door, thus locking the camera door in "close" position. Conversely, in unlocking the case, sliding bar 51 moves forwardly to close the magazine shutter. Since the locking mechanism disengages the door only during the final movement of this operation, it will be seen that the shutter is fully closed before it is possible to open the camera door to remove the magazine. This feature provides a safeguard against accidental exposure of the magazine to external light before the shutter has been closed.

Fig. 6 shows a modified construction wherein rotatable plate 40a is provided with peripheral teeth 62 that mesh with teeth 63 on sliding bar 51a. Plate 40a has an arcuate slot 45a corresponding with slot 45 in the previously described plate 40. The periphery of plate 40a extending through the rear end 15 of the casing may be scalloped as shown at 64 for ease in manually rotating the plate.

From the above description it is thought that the construction and advantages of this invention will be readily apparent to those skilled in the art. Various changes and modifications may be made without departing from the spirit or losing the advantages of the invention.

Having thus described the invention, what we claim as new and desire to secure by Letters Patent is:

1. In a movie camera of the magazine type, a case comprising a body portion and a door portion, a hinge connection between said portions at one end of said door portion, and a latching means interconnecting the other end of said door portion and said body portion, said latching means comprising a pair of spaced, fixed engageable members carried by said door portion, a pair of cooperating spaced, movable engaging members carried by said body portion, and means for moving said engaging members to and from said engageable members, said last named means comprising a sliding bar carrying said engaging members, a plate carried by said body portion and pivoted thereto, means for rotating said plate on its pivot within a limited range, said plate having a substantially circular slot therein, a pin extending from said sliding bar into said slot, the length of said slot being such that the movement of said pin required to effect engagement and disengagement of said engaging members occurs at the extreme limits of plate rotation, and a second sliding bar carried by said body portion and actuated in a positive manner by said rotatable plate, said second sliding bar having a slot therein disposed to receive a magazine shutter controlling pin extending from a magazine whereby the shutter is respectively opened and closed as said plate is rotated to latch and unlatch said door portion.

2. In a movie camera of the magazine type, a case comprising a body portion and a door portion, a hinge connection between said portions at one end of said door portion, and a latching means interconnecting the other end of said door portion and said body portion, said latching means comprising a fixed engageable member carried by said door portion, a cooperating movable engaging member carried by said body portion, means for moving said engaging member to and from said engageable member, said last named means including a plate carried by said body portion and pivoted thereto, means for rotating said plate within a limited range, said plate having an arcuate slot therein, a pin associated with said engaging member and extending into said slot, the length of said slot being such that the movement of said pin required to effect engagement and disengagement of said engaging member occurs at the extreme limits of plate rotation, and a sliding bar carried by said body portion and actuated in a positive manner by said rotatable plate, said sliding bar having means to receive a magazine shutter controlling pin extending from a magazine whereby the shutter is respectively opened and closed as said plate is rotated to latch and unlatch said door portion.

3. In a case for a movie camera of the magazine type including a body portion and a door portion, the combination therewith of a latching means interconnecting said portions, said latching means comprising an engageable member and engaging member each carried by one of said portions, means for moving said engaging member to and from said engageable member, said last named means including a pivotally mounted plate, means for rotating said plate within a limited range, said plate having an arcuate slot therein, a projection from said engaging member extending into said slot, the length of said slot being such that the movement of said projection required to effect engagement and disengagement of said engaging member occurs at the limits of plate rotation, and a sliding bar actuated in a positive manner by said rotatable plate, said sliding bar having means to receive a magazine shutter controlling pin extending from a magazine whereby the shutter is respectively opened and closed as said plate is rotated to latch and unlatch said door portion.

4. In a case for a movie camera of the magazine type including a body portion and a door portion, the combination therewith of a latching means interconnecting said portions, said latching means comprising an engageable member and engaging member each carried by one of said portions, means for moving said engaging member to and from said engageable member, said last named means including a pivotally mounted plate, means for rotating said plate within a limited range, said plate having an arcuate slot therein, a projection from said engaging member extending into said slot, and a sliding bar actuated in a linear manner by said rotatable plate, said sliding bar having means to receive a magazine shutter controlling pin extending from a magazine whereby the shutter is respectively opened and closed as said plate is rotated to latch and unlatch said door portion.

JACK BRISKIN.
JOSEPH J. GOLICK.

REFERENCES CITED

The following references are of record in the file of this patent:

UNITED STATES PATENTS

| Number | Name | Date |
| --- | --- | --- |
| 1,792,436 | Mery | Feb. 10, 1931 |
| 1,937,354 | Morsbach | Nov. 28, 1933 |
| 2,080,021 | Wittel | May 11, 1937 |
| 2,175,538 | Morsbach et al. | Oct. 10, 1939 |
| 2,186,612 | Mihalyli | Jan. 9, 1940 |
| 2,211,334 | Lechleitner | Aug. 13, 1940 |
| 2,262,570 | Wittel | Nov. 11, 1941 |
| 2,319,530 | Bolsey | May 18, 1943 |
| 2,357,158 | Zuber | Aug. 29, 1944 |